US006264192B1

(12) United States Patent
Siebenmann et al.

(10) Patent No.: US 6,264,192 B1
(45) Date of Patent: Jul. 24, 2001

(54) PROCESS AND APPARATUS FOR CONVEYING PRESSROOM PRODUCTS

(75) Inventors: Dieter Siebenmann, Russikon; Carl Conrad Mader, Hinwil, both of (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 09/214,234

(22) PCT Filed: Jul. 11, 1997

(86) PCT No.: PCT/CH97/00266

§ 371 Date: Dec. 31, 1998

§ 102(e) Date: Dec. 31, 1998

(87) PCT Pub. No.: WO98/03422

PCT Pub. Date: Jan. 29, 1998

(30) Foreign Application Priority Data

Jul. 19, 1996 (CH) .................................................. 1818/96
Dec. 19, 1996 (CH) .................................................. 3130/96

(51) Int. Cl.[7] .................................................. B65G 47/244

(52) U.S. Cl. .......................... 271/205; 271/204; 271/206; 271/85; 198/377.03; 198/377.07

(58) Field of Search .................................... 198/373, 374, 198/375, 376, 377, 378, 379, 377.1, 377.03, 377.06, 377.07, 400, 474.1; 271/81, 82, 85, 204, 205, 206

(56) References Cited

U.S. PATENT DOCUMENTS 2,471,347 * 5/1949 Rayburn ............................... 198/680
3,747,737 * 7/1973 Brooke ................................ 198/377
4,180,152 * 12/1979 Sefcik ............................ 198/377.06
4,586,598 * 5/1986 Ehlscheid et al. ............... 198/377 X
4,858,904 * 8/1989 Lindblom ......................... 198/374 X
4,887,809 12/1989 Eberle .
5,253,742 * 10/1993 Dooley .......................... 198/377.1 X
5,261,520 * 11/1993 Michael .
5,388,820 2/1995 Eberle et al. .
5,992,610 * 11/1999 Dufour et al. ................. 198/377.06

FOREIGN PATENT DOCUMENTS 574 364 4/1976 (CH) .
88 01 544 5/1988 (DE) .
0 352 421 1/1990 (EP) .
96 32293 10/1996 (WO) .

* cited by examiner

*Primary Examiner*—Christopher P. Ellis
*Assistant Examiner*—Patrick Mackey
(74) *Attorney, Agent, or Firm*—Alston & Bird LLP

(57) ABSTRACT

A process and apparatus for conveying printed products of the type having a main surface and a side edge, wherein each product is retained in the region of its side edge by an individual gripper, and wherein each gripper and its retained product are conveyed along a conveying path. The printed products are initially oriented such that their side edges run essentially perpendicularly to the conveying direction, and the grippers and products are then rotated about an axis of rotation which is perpendicular to the side edge of the product and perpendicular to the conveying direction. The spacing of the grippers may also be changed during such rotation.

21 Claims, 9 Drawing Sheets

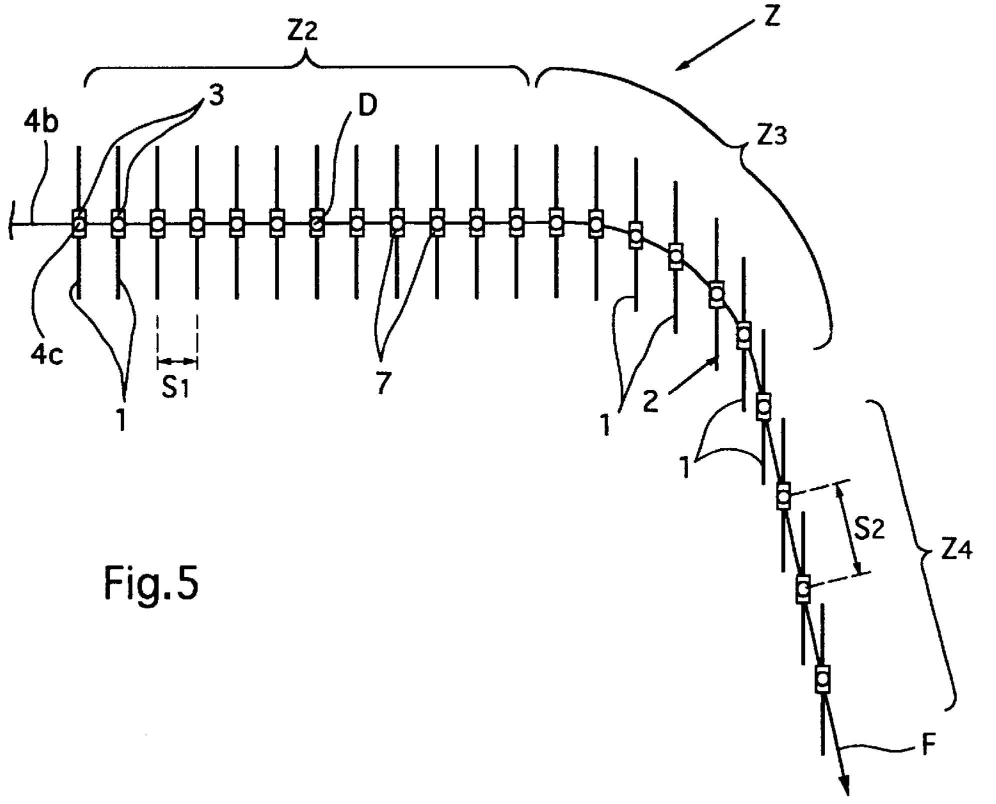
Fig.5
Fig.6
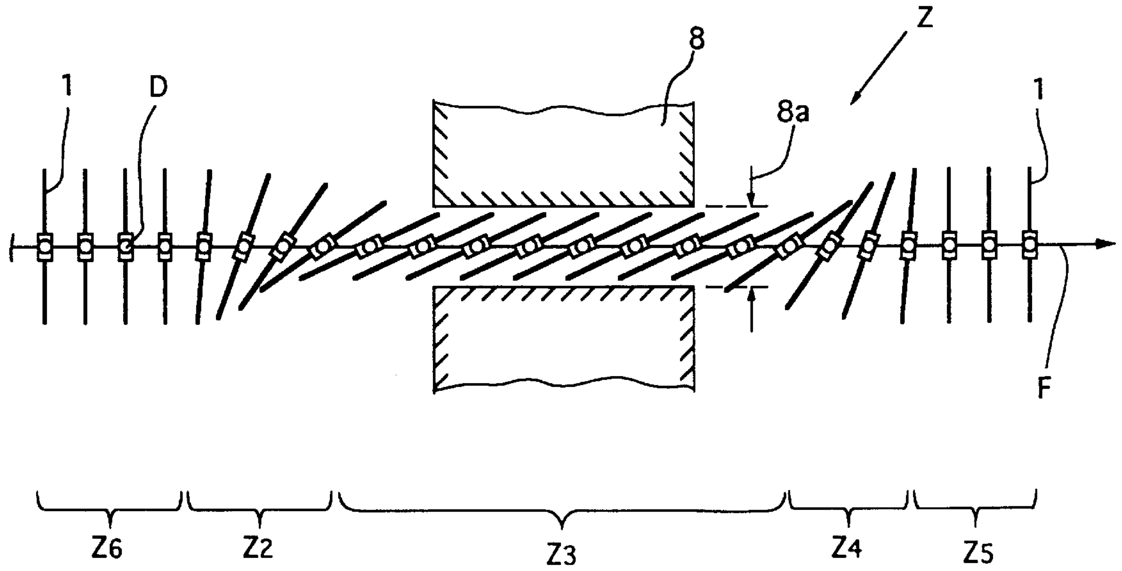

PROCESS AND APPARATUS FOR CONVEYING PRESSROOM PRODUCTS

BACKGROUND OF THE INVENTION

The invention relates to a process apparatus for conveying printed products along a conveying path.

EP 0 557 680 A1 discloses a conveying apparatus for conveying single-leaf or multi-leaf printed products. This apparatus has grippers which are fixedly connected to an endless link chain and move along a closed circulatory path. The printed products are retained approximately at right angles to the conveying direction.

The object of the present invention is to provide a process and an apparatus which are intended for conveying printed products and have increased flexibility as far as the position of the printed products with respect to the conveying direction is concerned.

This object is achieved by a process having the features as claimed in claim 1 and also by an apparatus having the features as claimed in claim 15. The subclaims 2 to 14 relate to further, advantageous configurations of the process according to the invention, and the subclaims 16 and 17 relate to further, advantageous configurations of the apparatus according to the invention.

An advantage of the process according to the invention and of the apparatus according to the invention can be seen by the fact that the gripper is mounted such that it can be rotated with respect to the conveying means, for example an endless link chain, with the result that, despite the predetermined path of the link chain, the printed product retained by the gripper can assume a multiplicity of controllable positions with respect to the conveying direction. A printed product, for example, in a first sub-section of the conveying path, is conveyed with a main surface running at right angles to the conveying direction and, in a second sub-section, is moved into a new position by a rotation of the gripper, with the result that the main surface runs, for example, transversely with respect to, or parallel to, the conveying direction. A printed product can also be rotated through an angle of, for example, 90 degrees or 180 degrees, for example during the conveying operation. The possibility of activating a printed product to rotate it either not at all or through 180 degrees during the conveying operation makes it possible, in addition, to select the alignment of the printed products, with the result that, after such a selecting operation, printed products arranged adjacent to one another along the conveying section, for example, are arranged in each case in opposite directions with respect to one another. Printed products may also be selected, for example, such that ten printed products are arranged along the conveying section such that they run in the same direction and the next ten printed products are arranged along said conveying section such that they run in the opposite direction, with the result that groups of printed products arranged in the same direction are formed.

The actuation of the grippers in order to effect rotation about the axis of rotation can be carried out by a multiplicity of possible arrangements, for example by a slotted-guide control means acting on the gripper or by a guide means acting on the printed product. The gripper may also have a spring element in order to move the gripper automatically into an initial position again after rotation has taken place. The rotatably configured grippers may be fixed on conveying means of different configurations, thus, for example, on a drawing means, on a chain, or on an easily and individually movable carriage. The carriages may also be coupled to one another by means of a pulling connection, it being possible for the pulling connection between the individual carriages, as is known for example from EP 0 309 702, to be formed by a spring element which can be shortened and lengthened elastically.

In one advantageous configuration of the invention, the main surface of a printed product is rotated into a position running parallel to the conveying direction, with the result that the outer surface or else the inner surface can be provided with text individually by a recording head. In a further, advantageous configuration of the invention, the printed products are arranged in a conveying section such that they can be rotated in a controlled manner, thus making it possible for them to be aligned with the gripped side edge or the main surfaces parallel to the alignment of a processing section and discharged in this state to the latter.

A printed product is preferably retained centrally in the region of a side edge by a gripper. However, it is also possible for a printed product to be retained eccentrically by a gripper.

The configuration of a gripper is known, to a person skilled in the art, from the prior art and is thus not described in any detail.

BRIEF DESCRIPTION OF THE DRAWINGS

Exemplary embodiments of the subject matter of the invention are explained in more detail hereinbelow with reference to the following figures, in which, purely schematically:

FIGS. 4*d*, 4*e* show a sectional illustration along the lines A—A and B—B, respectively, according to FIG. 4*b;*

FIGS. 4*f*, 4*g* show a sectional illustration along the lines C—C and D—D, respectively, according to FIG. 4*c;*

FIG. 5 shows a plan view of a curved conveying stream;

FIG. 6 shows a plan view of a conveying stream passing through a restriction;

DETAILED DESCRIPTION OF THE PREFERRED EMBODIMENTS

Figures 1A, 1B:
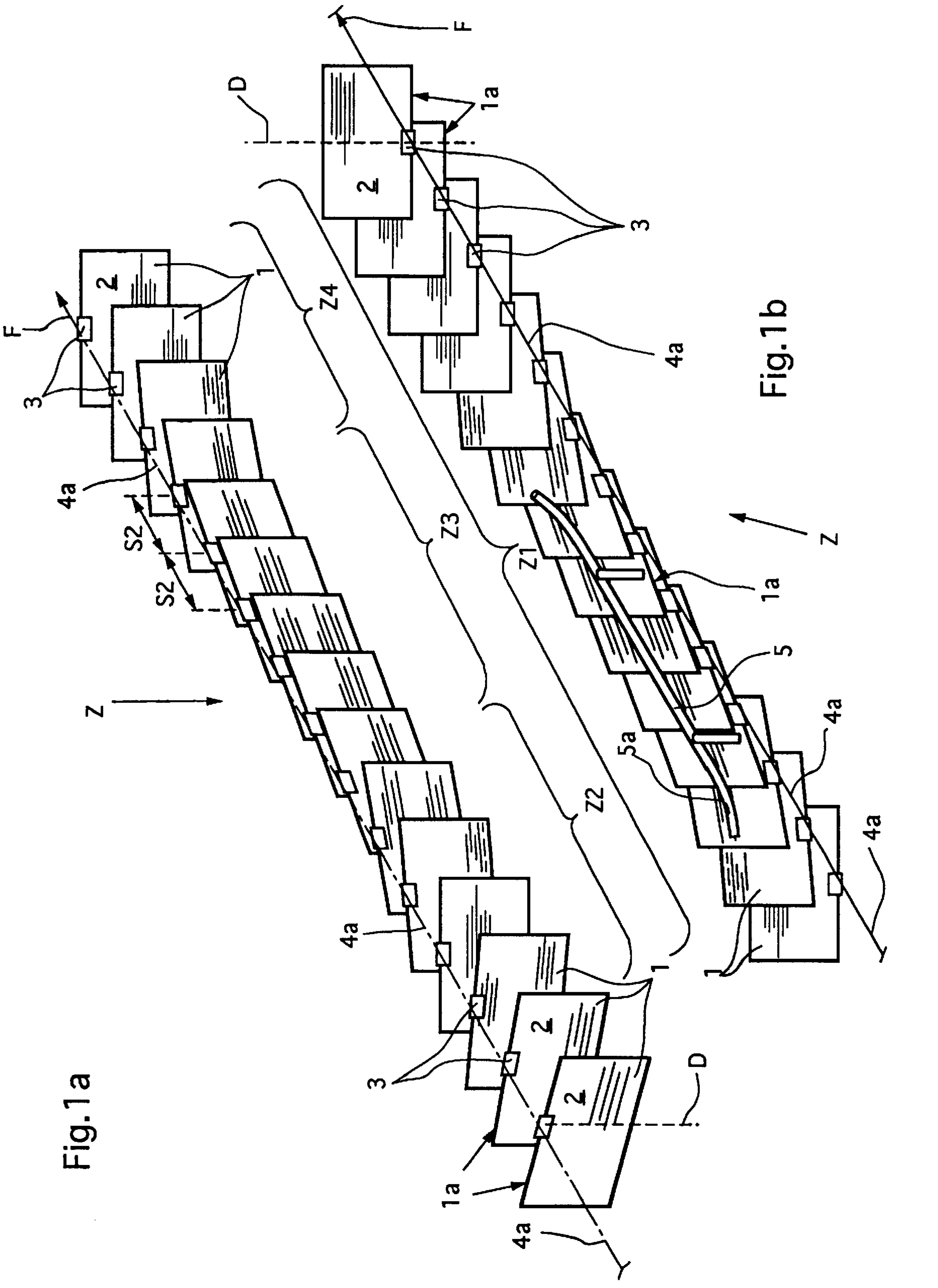
FIGS. 1*a*, 1*b* show a perspective view of two conveying streams with printed products retained in a rotatable manner.

FIG. 1*a* shows a section Z1 of a conveying path Z of a conveying apparatus which has a plurality of grippers 3, which each retain a printed product 1 and are conveyed in the conveying direction F. Each printed product 1 is retained in the region of a side edge 1*a*, approximately in the center in each case, by a gripper 3. The grippers 3 are fixed on a drawing means and are at a constant and fixed spacing S2 from one another. The drawing means used is a conveying chain 4*a*, which is arranged in a conveying channel (not shown). The conveying chain 4*a* may also be configured such that a variable spacing between the grippers 3 is possible, a maximum spacing being predetermined by the conveying chain 4*a*. In addition, each gripper 3 can be rotated about an axis of rotation D, with the result that the side edge 1*a* or the main surfaces 2 of a printed product 1 is/are kept rotatable with respect to the conveying direction F. In the example illustrated, the main surfaces 2 of the printed products 1 fed are in a position running perpendicularly with respect to the conveying direction F. In the sub-section Z2 of the conveying section, each individual printed product 1 is rotated, by a rotation of the gripper 3 about the axis of rotation D, with the mutual spacing S2 remaining constant in the process, into a position in which the main surfaces 2 enclose an acute angle with the conveying direction. No rotation about the axis of rotation D is executed during the course of the sub-section Z3, with the result that the printed products 1 running transversely with respect to the conveying direction F have essentially mutually parallel main surfaces 2. During passage through the sub-section Z4, the printed products 1 are rotated, with respect to the conveying direction F, back into the original position, which was assumed before the printed products ran into the first sub-section Z2, with the result that the main surfaces 2 of the printed products 1 run perpendicularly with respect to the conveying direction F again at the end of the sub-section Z4. In the exemplary embodiment illustrated, the printed products 1 hang with vertically running main surfaces 2 on the grippers 3.

FIG. 1*b* shows a section of a conveying path Z of a further conveying apparatus, of which the grippers 3, in the same way as in the exemplary embodiment according to FIG. 1*a*, are fixedly connected to a conveying chain 4*a*. In this exemplary embodiment, the printed products 1 are retained by the grippers 3 such that they stand essentially upright. The rotation of the printed products 1, which are moved in the conveying direction F, is assisted by two guide means 5, which are arranged on both sides of the conveying path and have an inlet region 5*a*, it being possible, in the exemplary embodiment illustrated, for the grippers 3 to have an automatically acting, restoring element, for example configured in the form of a spring, with the result that, after having passed the guide means 5, the gripper 3 moves the printed product 1 back into a position in which the main surface 2 or the side edge 1*a* runs perpendicularly, or essentially perpendicularly, with respect to the conveying direction F. The rotation can also take place without assistance by the guide means 5. The guide means 5 may be arranged on one side or both sides of the conveying chain 4*a* and act in a guiding or supporting manner on at least one of the two main surfaces 2 of a printed product 1. This action is only possible within a sub-section in which the side edge 1*a* does not run perpendicularly with respect to the conveying direction F. The grippers 3 may also be fastened individually on movable individual carriages 4*c*.

Figure 2A:
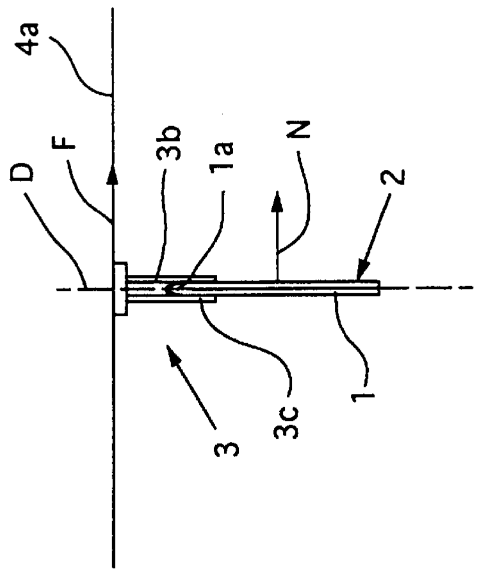
FIGS. 2*a*, 2*b*, 2*d* each show a side view of in each case one gripper with a printed product retained.

FIG. 2*a* shows a schematic illustration of a gripper 3 which is fixedly connected to the conveying chain 4*a* and is moved in the conveying direction F, the gripper 3 having two gripper jaws 3*b*, 3*c*, which can be pivoted relative to one another, for retaining a printed product 1, and the gripper jaws 3*b*, 3*c* being mounted such that they can be rotated about an axis of rotation D. The printed product 1 is retained in the region of the side edge 1*a* by the gripper jaws 3*b*, 3*c*, it being the case that, in the view illustrated, the side edge 1*a* runs perpendicularly with respect to the viewing plane. The printed product 1 hangs vertically downward on the gripper 3 and has a normal N which runs at right angles to the main surface 2 and parallel to the conveying direction F. FIG. 2*c* shows a plan view of the gripper 3 and the printed product 1 according to FIG. 2*a* in a position rotated through an angle α. The printed product 1 or the side edge 1*a* is rotated about the axis of rotation D, with the result that the conveying direction F and the normal N enclose an acute angle α. The printed products 1 illustrated in the sub-section Z3 in FIG. 1*a* are located, for example, in such a position.

FIG. 2*c* shows a side view of a further exemplary embodiment of a gripper 3 with gripper jaws 3*b*, 3*c*, which, in contrast to the exemplary embodiment according to FIG. 2*a*, retains the printed product 1 or the main surface 2 in a position inclined with respect to the conveying direction F. Once again, the axis of rotation D runs essentially perpendicularly with respect to the side edge 1*a* and essentially perpendicularly with respect to the conveying direction F. It would also be possible for the axis of rotation D to be aligned transversely with respect to the conveying direction F. The decisive factor is that the printed product 1 is retained by the gripper 3 with respect to the conveying direction F such that the rotation of the printed product 1 about the axis of rotation D changes the angle α between the conveying direction F and the normal N running at right angles to the main surface 2 of the printed product 1. This condition as regards the angle α is not satisfied if the main surface 2 runs parallel to the conveying direction F or if the conveying direction F runs perpendicularly with respect to the normal N. This condition is not satisfied either if the axis of rotation D runs parallel to the conveying direction F. In the case of a printed product 1 retained by a gripper 3 under these two conditions, the rotation about the axis of rotation D would not result in any change in the angle α, nor would there be any change in the alignment of the main surface 2 with respect to the conveying direction F.

The printed product 1 may be retained by the gripper 3 in a multiplicity of possible positions, and the axis of rotation D of the gripper 3 may run in a multiplicity of possible directions with respect to the conveying direction F, such that the rotation of the printed product 1 about the axis of rotation D changes the angle α between the conveying direction F and the normal N of the printed product 1.

Figure 2B:
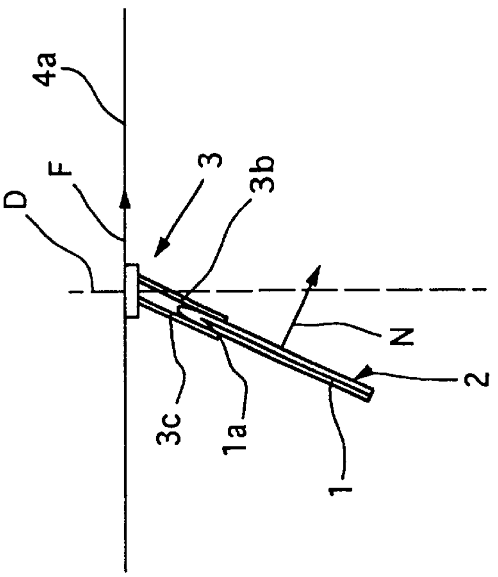
Figure 2C:
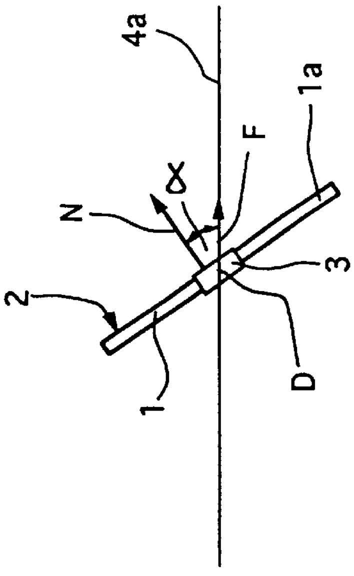
FIG. 2*c* shows a plan view of the gripper according to FIG. 2*a* in a rotated position.
Figure 2D:
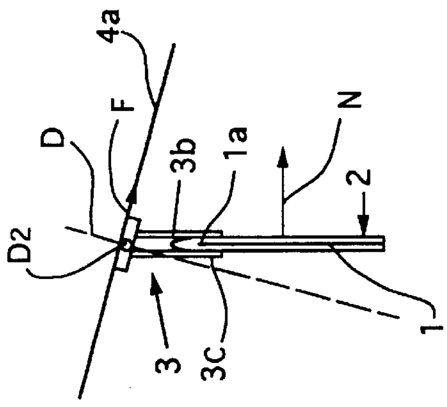

In the exemplary embodiment according to FIG. 2*b*, it would of course also be possible for the printed product 1, as illustrated in FIG. 2*d*, to be retained by the gripper 3 such that it is inclined forward with respect to the conveying direction F, with the result that, as seen from the side, the main surface 2 and the conveying direction F run at an acute angle with respect to one another.

FIG. 2*d* shows a side view of a further exemplary embodiment of a gripper 3, the conveying chain 4*a*, in contrast to the example according to FIG. 2*a*, having a conveying direction F which deviates from the horizontal. The condition which stipulates that the printed product 1 can be rotated by the gripper 3 about an axis of rotation D running essentially perpendicularly with respect to the side edge 1*a* retained applies in this arrangement as well, the axis of rotation D additionally being aligned with respect to the conveying direction F such that the rotation about the axis of rotation D changes the angle between the conveying direction F and the normal N running at right angles to the main surface 2 of the printed product 1. The gripper 3 may have an additional pivot axis D2, which, in the view illustrated, runs perpendicularly with respect to the viewing plane, in order to retain, for example, a printed product 1, as is illustrated, in an approximately vertically running position, irrespective of the progression of the conveying direction F.

Figure 3A:
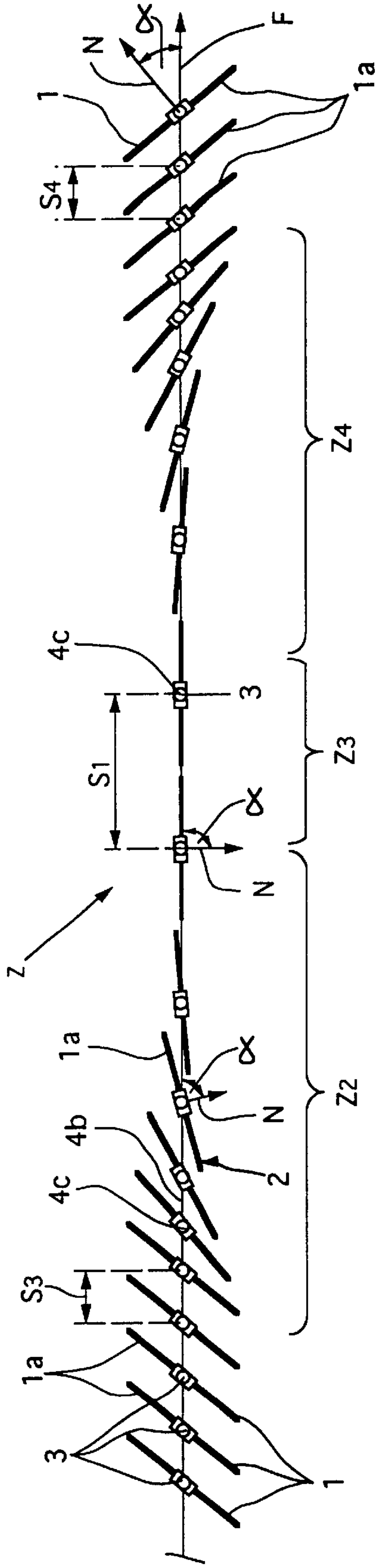
FIGS. 3*a*, 3*b* show a plan view of two conveying streams with printed products retained in a rotatable manner.

The plan view of a conveying stream with printed products 1 according to FIG. 3*a* shows an exemplary embodiment in which the grippers 3 are fastened on individual carriages 4*c* which are moved along the conveying path Z on a guide rail 4*b*. In their initial position, the grippers 3 convey the printed products 1 in an oblique position, running transversely with respect to the conveying direction F, to a section Z2 of the conveying section. During passage through this first sub-section Z2, the printed products 1 are rotated from the initial position into a position in which the main surfaces 2 run parallel to the conveying direction F, or in which the angle α between the normal N of the main surface 2 and the conveying direction F is 90 degrees. The spacing between the individual carriages 4*c*, and thus the individual grippers 3, can be varied. The small spacing S3 between the grippers 3 at the beginning of the sub-section Z2 is increased during passage through the sub-section Z2, with the result that the grippers 3 located in the sub-section Z3 have a greater spacing S1 between them, said spacing S1 being chosen to be at least large enough for successive printed products 1 not to come into contact with one another. In the following sub-section Z4, the grippers 3 are rotated further in the same direction of rotation as in sub-section Z2, with a simultaneous reduction in the mutual spacing, with the result that, after passage through the sub-sections Z2, Z3, Z4, the printed products 1 assume a new initial position, running transversely with respect to the conveying direction F, and are at a spacing S4 from one another which, in the example illustrated, is the same size as the spacing S3.

Figure 3B:
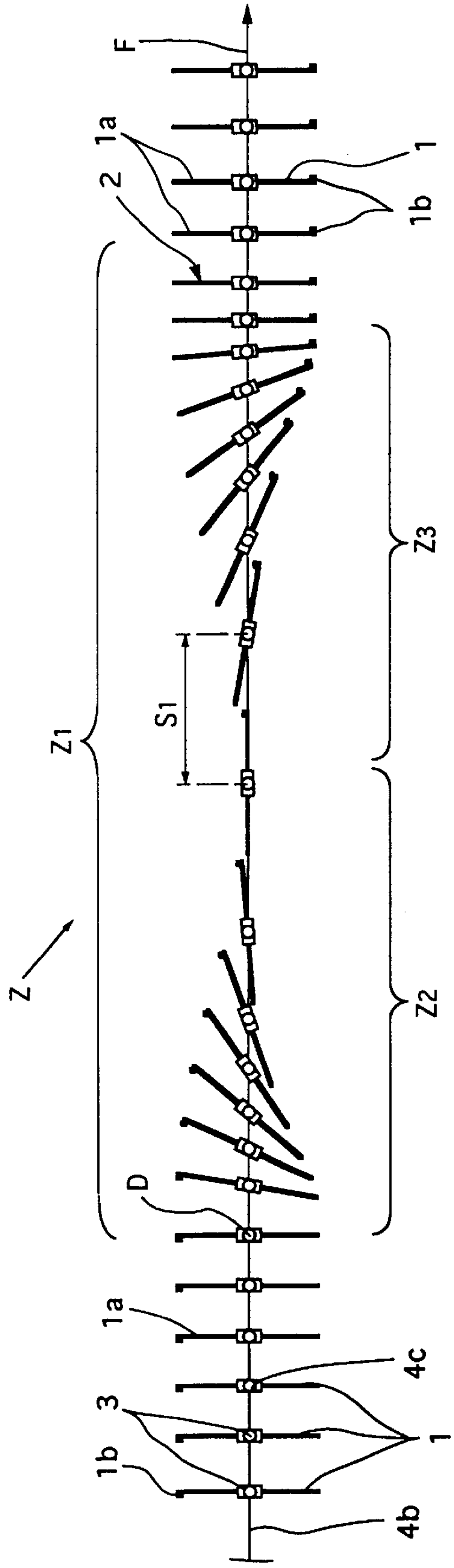

FIG. 3*b* shows a further plan view of a conveying stream of printed products 1, of which the main surfaces 2, before entering into the sub-section Z1, run perpendicularly with respect to the conveying direction F and are aligned in the vertical direction. One vertically running side edge 1*b* of the printed product 1, said edge being on the left-hand side with respect to the conveying direction F, is marked with a square so that the procedure taking place can be better understood. During passage through the section Z1, the printed products 1 are rotated through 180 degrees about a vertically running axis of rotation D, with the result that, at the end of the section Z1, the marked side edge 1*b* forms the right-hand side edge, as seen in the conveying direction F. The section Z1 is divided into two sub-sections Z2, Z3, the printed products [sic] 1, in the first sub-section Z2, being rotated until the main surface 2 runs parallel to the conveying direction F, the mutual spacing being increased in the process, and, in the following sub-section Z3, being rotated until the main surface 2 runs perpendicularly with respect to the conveying direction F, the mutual spacing being reduced in the process. In the exemplary embodiment illustrated, the marked side edges 1*b* are all arranged in the same direction after passage through the section Z1.

However, during passage through the section Z1, it is also possible for the printed products 1 to be selected such that, rather than all the printed products 1 being rotated, it is only those in which the marked side edge 1*b* is to be moved to the other side with respect to the conveying direction F which are rotated. In order to achieve this, at the point of transfer between the sub-sections Z2, Z3, the direction of rotation of the gripper 3 is chosen, in accordance with the desired end position of the side edge 1*b* , such that, at the end of the section Z1, the side edges 1*b* are arranged, for example, alternately on the left-hand side and right-hand side with respect to the conveying direction F, or that, for example, groups are formed such that, for example, three successive printed products have a side edge 1*b* arranged on the right-hand side with respect to the conveying direction F and the next three successive printed products have a side edge 1*b* arranged on the left-hand side with respect to the conveying direction F. Of course, the conveying process illustrated in FIG. 3*b* is also suitable for specifically controlling the alignment of printed products 1 with respect to the conveying direction F, in that, for example, the printed products pass to the sub-section Z2 in a random arrangement as far as the position of the side edge 1*b* is concerned, it being the case that a sensor establishes the position of the side edges 1*b* , and, during passage through the section Z1, the printed products 1 are rotated in a controlled manner such that the side edges 1*b* leave the sub-section Z3 in a predeterminable arrangement with respect to the conveying direction F.

Figures 4A, 4B, 4C:
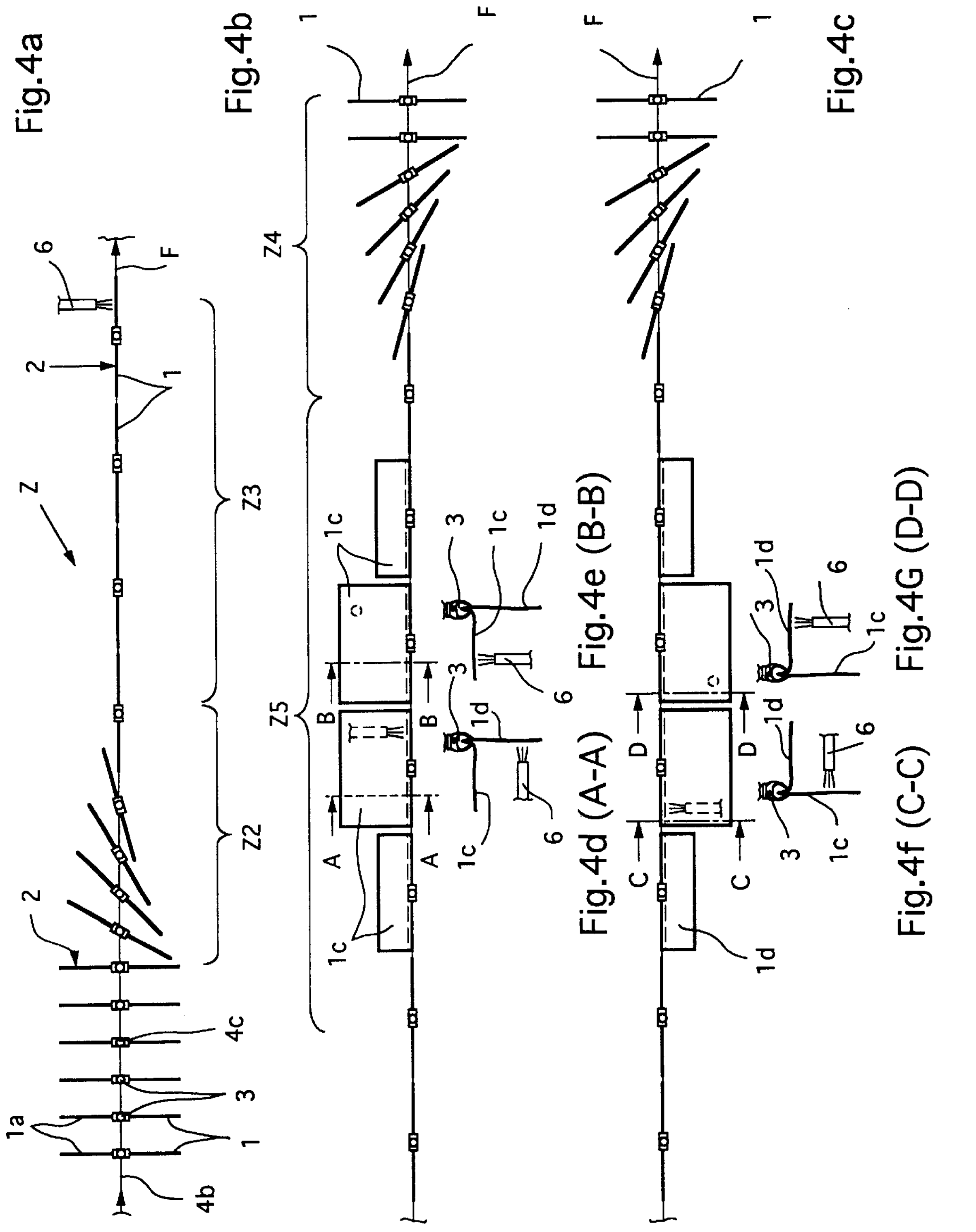
FIG. 4*a* shows a plan view of a conveying stream with printed products which are provided with text on the outside.
FIGS. 4*b*, 4*c* each show a continuation of the conveying stream according to FIG. 4*a* with text being provided on an inner side of the printed products.

FIG. 4*a* shows a further plan view of a conveying path Z with printed products 1 which are conveyed at variable spacings from one another by grippers 3 fastened on individual carriers 4*c*. The printed products 1, which arrive with the main surface 2 perpendicular with respect to the conveying direction F, are rotated in a first sub-section Z2, the mutual spacing being increased in the process, with the result that the printed products 1 are arranged in the following sub-section Z3 with a main surface 2 running parallel to the conveying direction F. In this position, the printed products 1 may be provided with text on their outer surface by a recording head 6, in order to apply, for example, a personalized text or an address. A possible continuation of the conveying stream according to FIG. 4*a* is illustrated in FIG. 4*b*, in which, in the sub-section Z5, individual product parts 1*c*, for example individual pages, are lifted by a lifting means (not illustrated in detail), with the result that both the lifted part 1*c*, as illustrated by a sectional illustration in FIG. 4*e*, and the non-lifted part 1*d* of the printed product 1, as is illustrated by a sectional illustration in FIG. 4*d*, can be provided with text on the inner surface by a recording head 6. Toward the end of the sub-section Z5, the lifted product part 1*c* is moved into the initial position again, and the printed product 1 which has text provided on it is rotated through 90 degrees in a following sub-section Z4, with the result that the printed products 1 can be fed to further processing or conveying processes with a main surface 2 running perpendicularly with respect to the conveying direction F or in the initial position assumed in FIG. 4*a*. In the variant according to FIG. 4*c*, instead of the product part 1*c* which is lifted in FIG. 4*b*, the product part 1*d* is lifted, the product part 1*c* remaining in the initial position. Otherwise, the processes are the same, as can be seen from the sectional drawings according to FIGS. 4*f* and 4*g*. It can be seen from FIGS. 4*d*, 4*e*, 4*f*, 4*g* that the gripper jaws 3*b*, 3*c* of the gripper 3 run parallel to the conveying direction F and parallel to the alignment of the main surface 2, of the side edge 1*a* and of the pages 1*c*, 1*d*, with the result that the pages 1*c*, 1*d* can easily be swung open virtually to the full extent.

FIG. 5 shows a further exemplary embodiment of a stream of printed products 1 which is conveyed along a conveying rail 4*b* by means of individual carriages 4*c*, the grippers 3 being at a constant spacing S1, with respect to the conveying direction F, in the first sub-section Z2. The spacing is increased during the course of the curved sub-section Z3, with the result that, in the substantially rectilinear sub-section Z4, the grippers 3 are at a spacing S2 from one another which is greater than the spacing S1. During the course of the curved sub-section Z3, the grippers 3 are rotated about the axis of rotation D counter to the direction of curvature such that all the printed products 1 arranged in the conveying section Z illustrated are aligned essentially parallel to one another. The product position is thus maintained despite a change in the conveying direction F.

FIG. 6 shows a plan view of a conveying stream which passes through an obstruction 8 with a through-passage and a width 8*a*, said width 8*a* being smaller than the width of the printed products 1 conveyed. The printed products 1, which enter the sub-section Z6 in an initial position, are rotated about the axis of rotation D by the grippers 3, in a first sub-section Z2, such that the overall width of the conveying stream is smaller than the width 8*a* of the through-passage in the obstruction 8, with the result that the printed products 1 pass the constriction without contact. After the constriction, the printed products 1 are rotated back into the initial position in a sub-section Z4, with the result that, in the sub-section Z5, they resume their initial position and can be fed to further processing.

Figure 7:
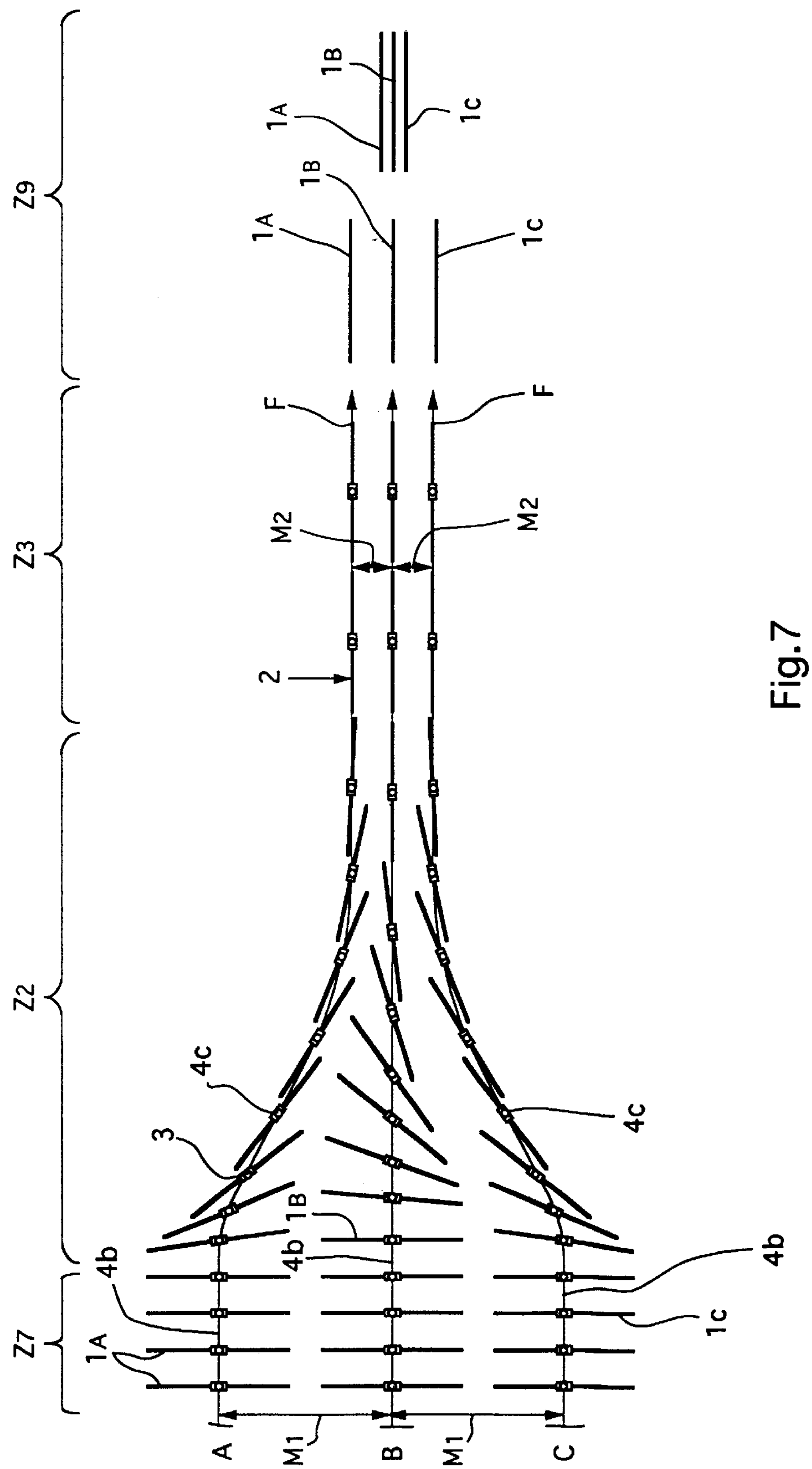
FIG. 7 shows a plan view of three mutually parallel conveying streams with the spacings between them changing.

FIG. 7 shows three conveying paths A, B, C running parallel to one another in the sub-sections Z3 and Z7 the printed products 1A, 1B, 1C of each conveying path A, B, C: being arranged vertically with respect to the conveying direction F in the sub-section Z7 and the mutually parallel conveying paths A, B, C being at a spacing M1 from one another. In the following sub-section Z2, the printed products 1A, 1B, 1C and the grippers 3 are rotated through 90 degrees, the spacing between the grippers being increased in the process, it being the case that the conveying paths A, B, C, in addition, come closer together, with the result that, in the sub-section Z3, the conveying paths A, B, C are at a spacing M2 from one another which is smaller than the spacing M1, the printed products 1A, 1B, 1C being retained in the sub-section Z3 with main surfaces 2 running parallel to the conveying direction F. The arrangement according to FIG. 7 makes it possible, by rotation of the printed products 1, to reduce the spacings between the conveying paths A, B, C in the sub-section Z3 to a great extent, with the result that the conveying paths A, B, C can be arranged such that they run very closely alongside one another. The printed products 1A, 1B, 1C conveyed can be separated, for example, in a following sub-section Z9, with the result that desired product groups can be combined, as is illustrated, for example, by collation, to form a stack with the product sequence 1A/1B/1C. Of course, it is also possible for a greater number of conveying paths A, B, C to be brought closer together by the conveying process illustrated in FIG. 7.

Figure 8:
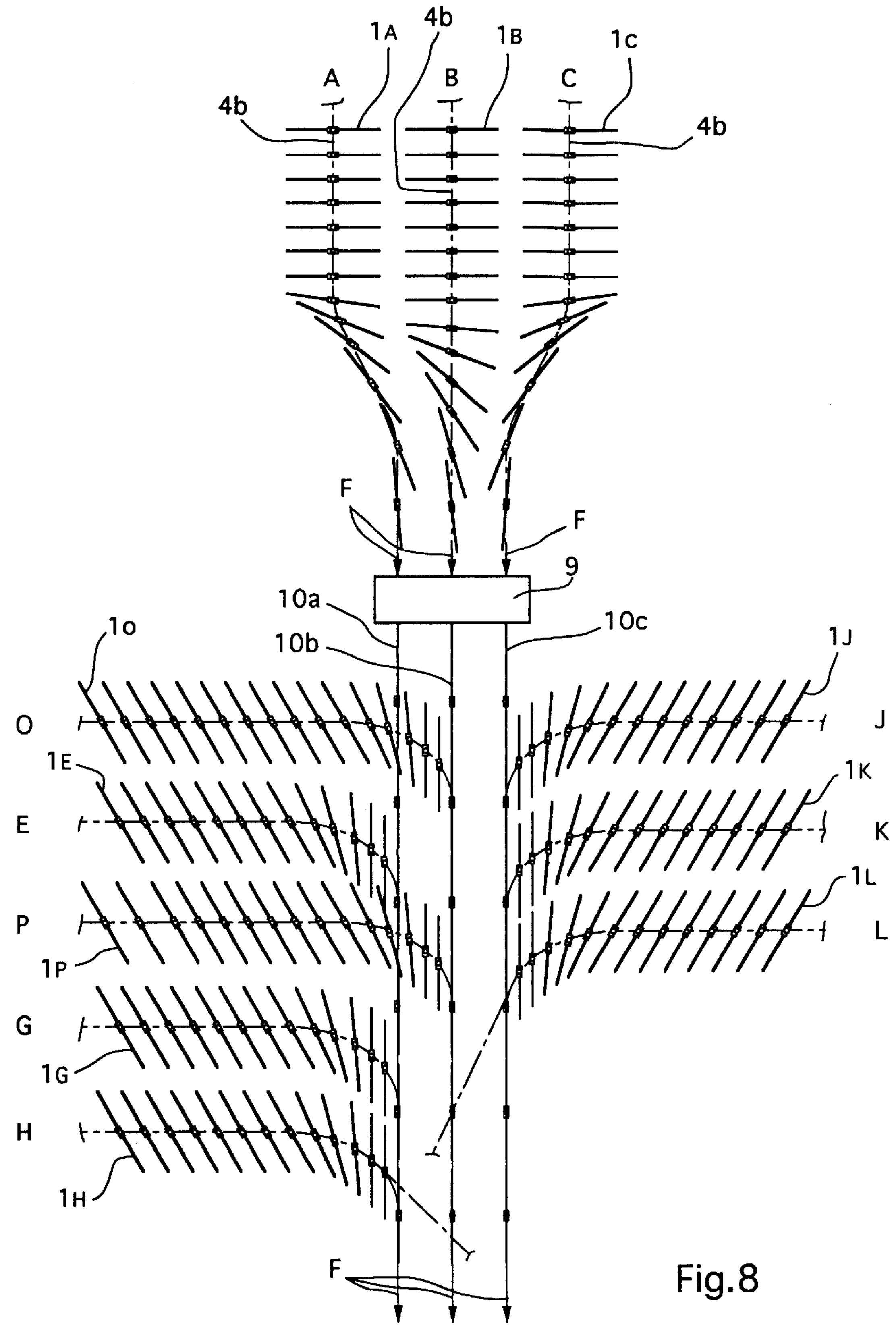
FIG. 8 shows a plan view of a plurality of conveying streams opening out into processing lines.
Figure 8C:
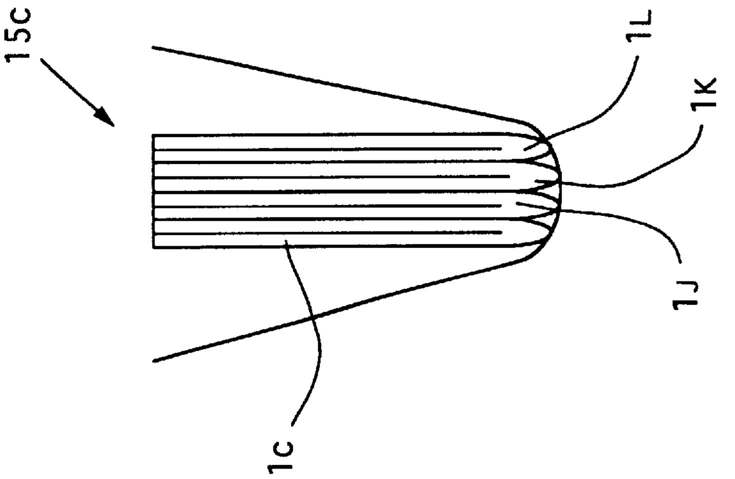
FIGS. 8*a*, 8*b*, 8*c* show products of possible processing principles on the processing lines according to FIG. 8.
Figure 8B:
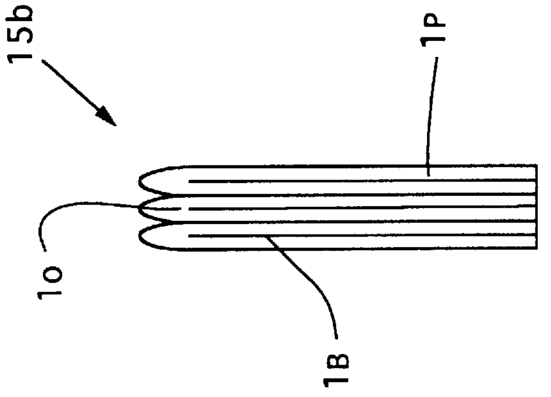
Figure 8A:
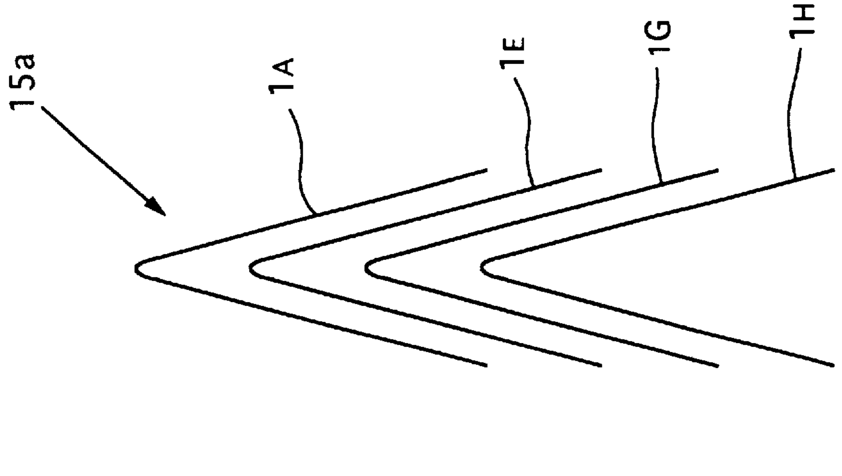

FIG. 8 shows a plurality of conveying paths A, B, C, in which, as is described in detail in FIG. 7, the printed products 1A, 1B, 1C are fed, after rotation, to a transfer point 9, at which the printed products 1A, 1B, 1C are transferred in a hanging position, and running parallel to the conveying direction F, to three rectilinear and mutually parallel processing lines 10*a*, 10*b*, 10*c*. In the region of the processing lines 10*a*, 10*b*, 10*c*, further conveying paths processing lines 10*a*, 10*b*, 10*c* in each case, the alignment of the printed products 1 of these conveying paths O, E, P, G, H, J, K, L being changed, similarly to the way shown in FIG. 5, by a rotation of the respective grippers 3 such that, not later than when the respective conveying path opens into the corresponding processing line 10*a*, 10*b*, 10*c*, the printed products 1O, 1E, 1P, 1G, 1H, 1J, 1K and 1L run parallel to the alignment of the processing lines 10*a*, 10*b*, 10*c*, with the result the printed products can be transferred in the correct position. The conveying paths H and L run via all three processing lines 10*a*, 10*b*, 10*c* such that the printed products 1H, 1L can be transferred by choice to one or more of the processing lines 10*a*, 10*b*, 10*c*. At the end of the processing lines 10*a*, 10*b*, 10*c*, three end products 15*a*, 15*b*, 15*c*, as illustrated in FIGS. 8*a*, 8*b*, and 8*c*, are obtained, and these end products either may be configured identically or, as illustrated in FIGS. 8*a*, 8*b*, 8*c*, are configured differently, the first end product 15*a*, according to FIG. 8*a*, being produced by a collecting operation and having a printed-product sequence 1A/1E/1G/1H, the second end product 15*b*, according to FIG. 8*b*, being produced by a collating operation and having a printed-product sequence 1B/1O/1P, and the third end product 15*c*, according to FIG. 8*c*, being produced by an insertion operation and having a printed-product sequence 1C/1J/1K/1L.

Figure 9:
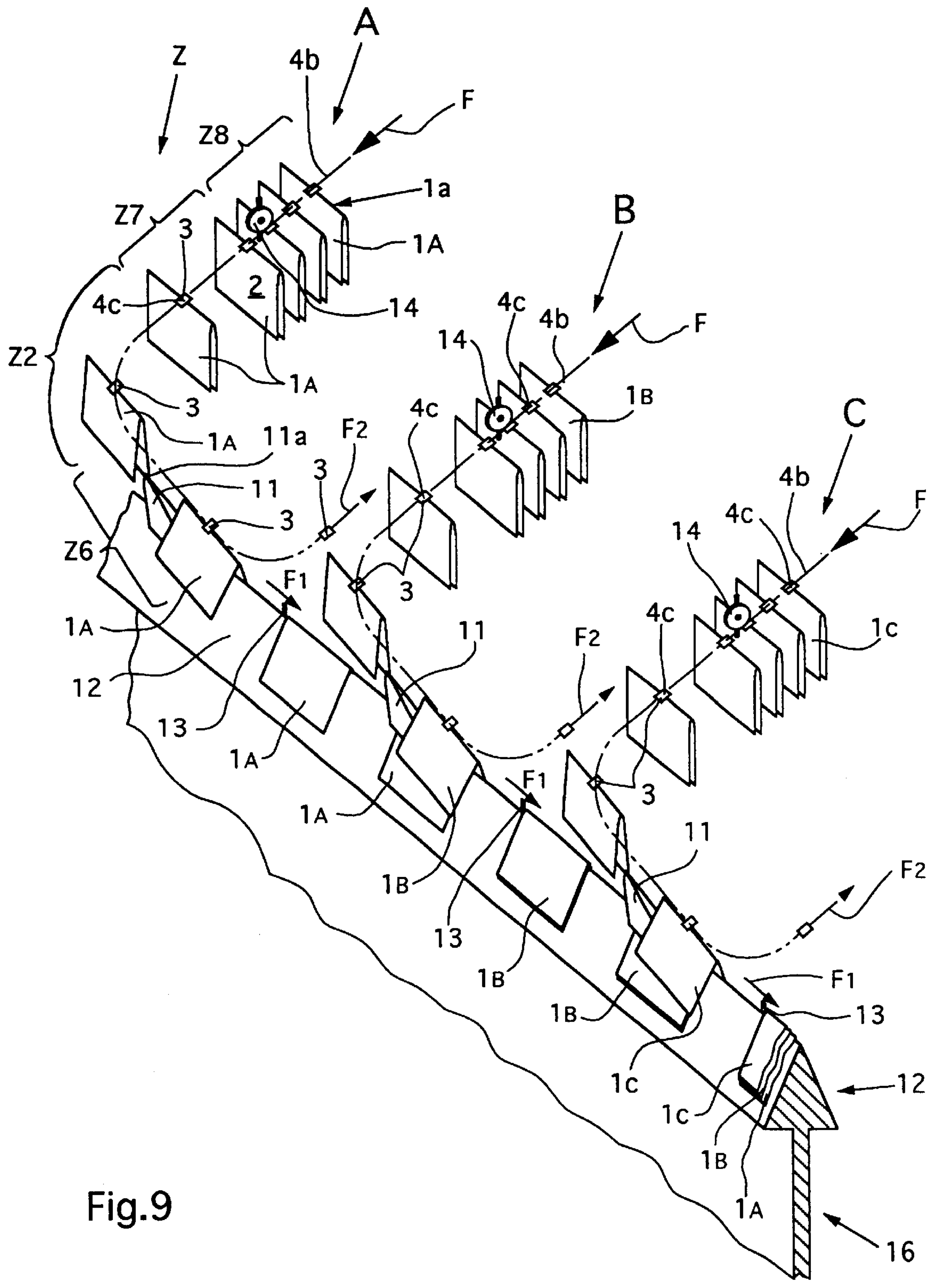
FIG. 9 shows a perspective view of a plurality of conveying streams opening out into a common processing line.

FIG. 9 shows a perspective view of a plurality of conveying paths A, B, C, which open out into a processing section 12, which is designed as a collecting section. Each conveying path A, B, C is configured to run in the same way, so that only the conveying path A will be described in detail. The printed products 1A, which are conveyed in the conveying path A, by means of individual carriages 4*c*, along the guide rail 4*b* in the conveying direction F and are retained by rotatable grippers 3, are fed, along the conveying path Z, to a first sub-section Z8, said sub-section Z8 being delimited by a stop device 14 which, if appropriate, stops the individual carriages 4*c* and releases them in a regular time sequence for continued movement to the processing section 12. In the sub-section Z7, the printed products 1A run in a rectilinear direction and pass, at regular spacings and at time intervals determined by the stop device 14, to the adjoining, arcuate sub-section Z2 and, thereafter, for the transfer of the printed product 1A to the processing section 12, to the sub-section Z6, which runs parallel to the processing section. During passage through the sub-section Z2, the gripper 3, as is also illustrated in FIG. 5, is rotated with respect to the arcuate progression of the guide rail 4*b* such that the alignment of the main surfaces 2 of the printed product 1A remains essentially unchanged, with the result that, in the following sub-section Z6, the printed product 1A is lowered parallel to the processing section 12 and, in the process, is opened by a stationary opening lug 11 with an insertion tip 11*a*. In this case, the two product halves are spread open and the printed product 1A is positioned in a straddling manner on the processing section 12, or on the printed products which have already been placed in position. The printed products 1A, 1B, 1C released by the gripper 3 and deposited on the processing section 12 are conveyed in the conveying direction F1 by a projecting conveying protrusion 13. This allows a plurality of individually conveyed printed products 1A, 1B, 1C to be collected at the processing station 16. After the gripper 3 has been opened, the guide rail 4*b* continues in a conveying direction F2, in which case the gripper 3 grips a new printed product 1A, 1B, 1C at a location which is not shown in the illustration.

What is claimed is:

1. A process for conveying printed products of the type having a main surface and a side edge, comprising the steps of retaining each printed product in the region of its side edge by an individual gripper, conveying each gripper and retained printed product along a conveying path in a conveying direction, and during the conveying step, rotating the printed products and their associated grippers about an axis of rotation which runs essentially perpendicularly with respect to the side edge of the retained product and is also oriented with respect to the conveying direction such that the rotation changes the angle between the conveying direction and a normal running at right angles to the main surface of the retained product, and wherein each printed product is rotated out of an initial position in which the associated side edge runs essentially perpendicularly with respect to the conveying direction.

2. The process as defined in claim 1 wherein the rotating step includes rotating each printed product into an end position in which the retained side edge runs essentially perpendicularly with respect to the conveying direction.

3. The process as defined in claim 2 wherein the step of rotating each printed product out of an initial position, and the step of rotating each printed product into an end position, occur within respective sections of the conveying path.

4. The process as defined in claim 1 wherein the step of rotating each printed product out of an initial position includes rotating each printed product to an intermediate position wherein the side edge of each product is aligned essentially parallel to the conveying direction.

5. The process as defined in claim 1 wherein the step of rotating each printed product out of an initial position includes rotating each printed product by about 180° about the axis of rotation.

6. The process as defined in claim 1 wherein the retaining step includes supporting the printed products in a hanging position from their associated grippers.

7. The process as defined in claim 1 wherein the conveying path includes a curved section, and wherein the rotating step includes rotating the printed products and associated grippers as they move through the curved section so that the main surfaces remain parallel to each other.

8. The process as defined in claim 1 wherein the conveying step includes conveying some of the grippers and retained printed products along each of a plurality of conveying paths, and wherein the rotating step includes rotating the grippers and retained products on each conveying path from the initial position to a subsequent position wherein the side edge of each product is aligned essentially parallel to the conveying direction.

9. The process as defined in claim 8 wherein the plurality of conveying paths are generally parallel, and wherein the spacing of the conveying paths is less when the products are in the subsequent position than when they are in the initial position.

10. The process as defined in claim 1 comprising the further step of varying the spacing between adjacent grippers during the rotating step.

11. The process as defined in claim 10 wherein the step of varying the spacing includes increasing the spacing in proportion with the angle between the conveying direction and a normal to the main surface of the products.

12. The process as defined in claim 1 comprising the further step of processing the printed products during the conveying step by applying text to the products or trimming their side borders.

13. The process as defined in claim 1 wherein the printed products are folded to form the side edge which is gripped by the grippers, and to form parts which depend from the folded side edge, and comprising the further step of separating the parts of each product from each other and applying text to one of the separated parts during the conveying step.

14. The process as defined in claim 1 wherein the printed products are each gripped in a medial region of the side edge.

15. The process as defined in claim 1 wherein the rotating step includes sequentially rotating the printed products.

16. The process as defined in claim 1 wherein the rotating step includes contacting the products with a fixed guide member which acts to rotate the products out of the initial position.

17. The process as defined in claim 1 comprising the further step of discharging the printed products to a further processing apparatus in a position in which the side edges run essentially parallel to the conveying direction.

18. An apparatus for conveying printed products of the type having a main surface and a side edge, comprising a conveyor extending along a conveying path which defines a conveying direction, a plurality of individual grippers mounted in a spaced apart arrangement along the conveyor, with the grippers each being configured for gripping one of the printed products in the region of its side edge and for rotation about an axis of rotation which runs essentially perpendicularly with respect to the side edge of the retained product and is also oriented with respect to the conveying direction such that the rotation changes the angle between the conveying direction and a normal running at right angles to the main surface of the retained printed product, and a control system wherein, along an initial section of the conveying path, each printed product is disposed in an initial position in which the associated side edge runs essentially perpendicularly with respect to the conveying direction, and each printed product is rotated about said axis of rotation and out of the initial position as the product moves along the conveying path beyond said initial section.

19. The apparatus as defined in claim 18 wherein the grippers are attached to the conveyor at a fixed or variable spacing.

20. The apparatus as defined in claim 18 wherein the control system includes a fixed guide member which is positioned to engage the printed products as they move along the conveying path.

21. The apparatus as defined in claim 18 wherein the grippers are each also rotatable about a pivot axis which is perpendicular to the conveying direction and perpendicular to said axis of rotation.

* * * * *